Jan. 6, 1925.

R. V. McCLURE 1,521,961

GATE OPERATING MECHANISM

Filed Dec. 19, 1923   2 Sheets-Sheet 1

R. V. McClure
Inventor

By  *[signature]*
Attorney

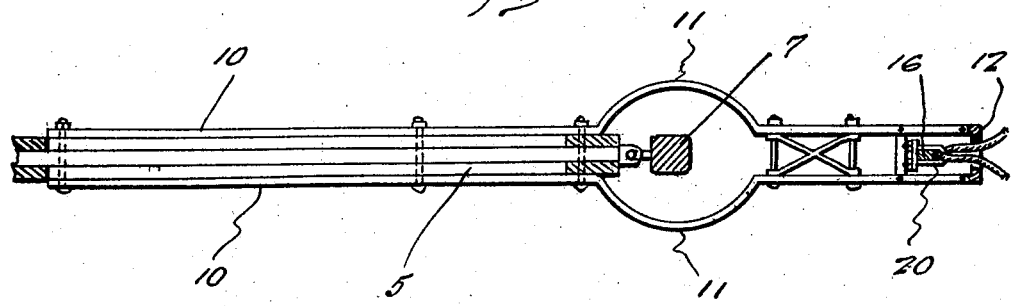
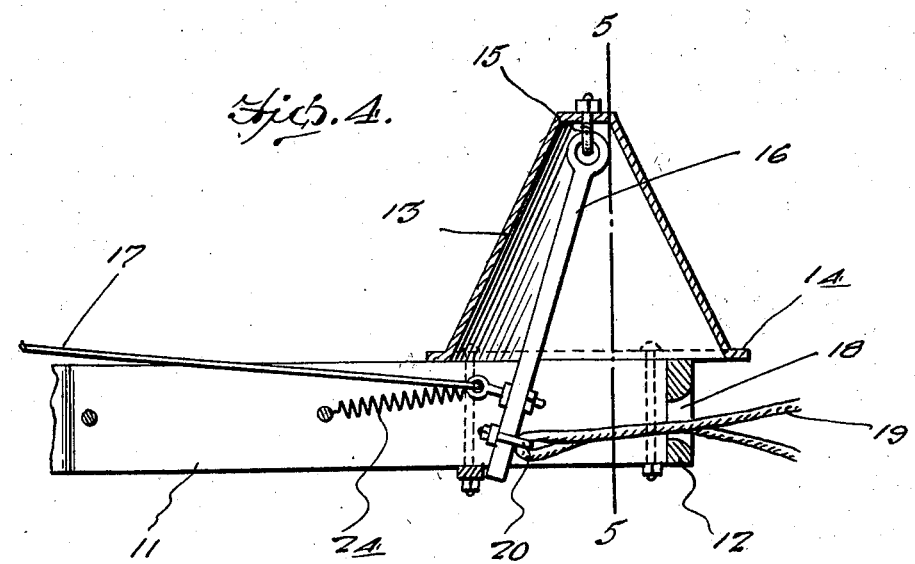
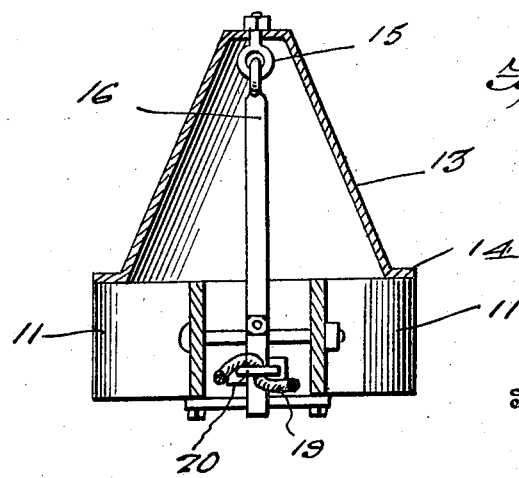

Patented Jan. 6, 1925.

1,521,961

UNITED STATES PATENT OFFICE.

ROWLIN VAN McCLURE, OF VERONA, MISSOURI.

GATE-OPERATING MECHANISM.

Application filed December 19, 1923. Serial No. 681,562.

*To all whom it may concern:*

Be it known that I, ROWLIN VAN MC-CLURE, a citizen of the United States, residing at Verona, in the county of Lawrence and State of Missouri, have invented certain new and useful Improvements in Gate-Operating Mechanism, of which the following is a specification.

This invention relates to an improvement in the general art of gates and has more particular reference to an operating mechanism therefor, the primary object of the invention residing in the provision of such a means wherein the gate may be moved to opened or closed positions by a person remote from the gate and this especially while one is riding upon a vehicle or agricultural implement thereby overcoming the necessity of getting down from the vehicle or implement and opening the gate directly by hand.

An additional object of the invention is to provide an operating mechanism for gates wherein the same is of such a simple nature as to be readily associated with practically all types of gates now used, the invention comprising but few parts and these correlated in such a manner as to reduce the possibility of disarrangement to a minimum. Notwithstanding this, the invention embodies the desired features of efficiency of operation and durability of construction.

With the above and other objects in view as the nature of the invention will be better understood, the same comprises the novel form, combination and arrangement of parts hereinafter more fully described, shown in the accompanying drawings and claimed.

Figure 1:
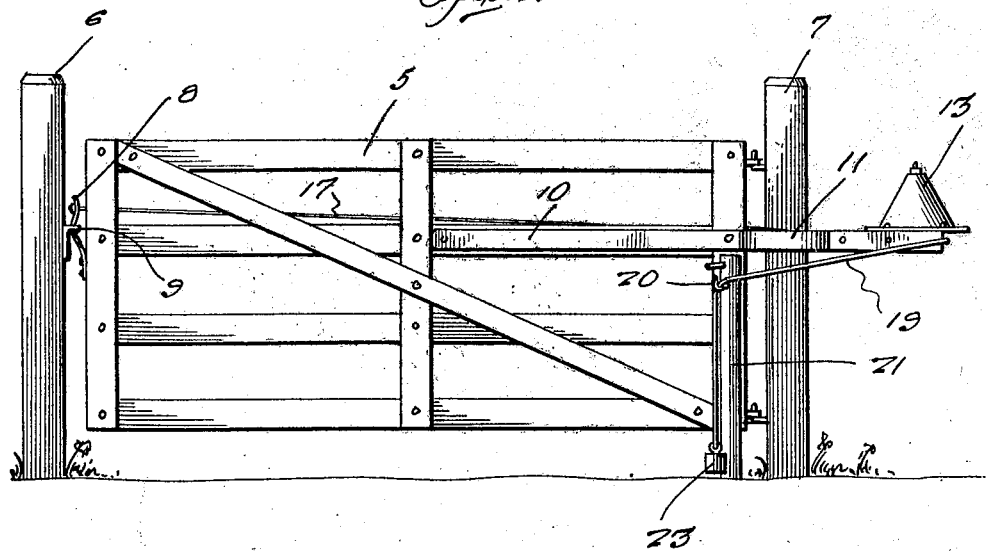
Figure 2:
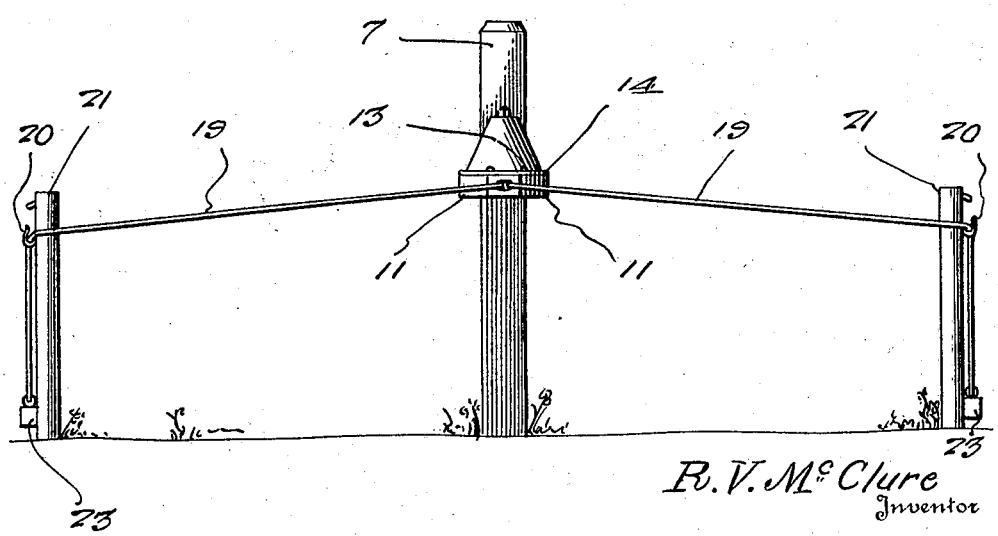

In the drawings wherein there is disclosed the most practical embodiment of the invention with which I am at this time familiar, and wherein like reference characters indicate corresponding parts throughout the different views, Figure 1 is a side elevational view of a farm gate equipped with my improved operating mechanism, Figure 2 is an end elevational view thereof, Figure 3 is an enlarged fragmentary longitudinal sectional view through a portion of the gate and the operating mechanism, Figure 4 is an enlarged detail longitudinal sectional view through a portion of the operating mechanism per se, and Figure 5 is a detail vertical sectional view of the operating mechanism taken at a right angle to the view shown in Fig. 4.

Now having particular reference to the drawings, 5 indicates any desired type of gate that is set between two posts 6 and 7, said gate being hinged at one end in any desirable manner for free swinging movement in opposite directions to the post 7 and adapted to be detachably fastened to the post 6 through the medium of a spring or other fastener 8, carried by the free edge of the gate for engagement with a keeper 9 carried by the post 6.

My invention per se embodies the provision of a pair of metal strips 10—10 that are rigidly secured through the medium of bolts or the like, to opposite sides of the gate 5 and at a point adjacent its hinged end. As shown in several of the views, these metal strips are disposed horizontally and extend considerably beyond the hinged end of the gate the portion of these strips adjacent the post 7 being bulged outwardly as at 11—11 for allowing a free swinging movement of the gate upon the post 7. The outer projecting ends of these metal strips are inter-connected in spaced relation through the medium of an integral cross piece 12, Figures 2 and 3.

Positioned upon the metal strips 10—10 at their outer projecting ends is an inverted cone-shaped hood 13 that terminates at its lower enlarged end into a lateral flange 14 whereby the same may be bolted or otherwise suitably secured to said metal strips 10—10. Loosely pivotally secured as at 15 to the top wall of the hood 13 and pendant therefrom, is a relatively elongated arm 16 that extends downwardly between the strips 10—10. Connected at one end to a point adjacent the lower end of this arm 16 is a cable 17 that extends forwardly between the strips 10—10 and then along one side of the gate for attachment at its opposite end to the spring or other latch 8.

Extending through an opening 18 in the connecting portion between said strips 10—10 is the central portion of a relatively long cable 19 which central portion is connected as at 20 to the arm 15 adjacent its lower end.

The ends of this cable 19 are then extended in a longitudinal direction from both sides of the gate 5 after which they are dropped over hooks 20—20, carried by vertical posts 21—21 in alinement with the gate post 7 and upon opposite sides thereof, these last mentioned posts 21—21 being as clearly shown in Figure 2, at a point substantially remote from said gate post 7 whereby the opposite ends of the cable 19 may be pulled for consequently swinging the arm 16 rearwardly for thereby pulling upon the cable 17 for consequently releasing the latch 8 and moving the gate to an open position. The extreme free ends of the cable 19 are provided as clearly shown in Figure 2 with counter-balancing weights 23.

The operating arm 16 for the cable 17 is normally maintained in the position shown in Figure 4 through the medium of a coiled spring 24 that is connected at one end to the point of connection between the cable 17 and the arm and at its opposite end to the inner side of one of the metal strips 10—10.

It will thus be seen that the gate 5 may be effectively unlocked and swung to an open position by persons within vehicles or upon agricultural implements at a point remote from the gate thereby overcoming the necessity of going directly to the gate and opening the same in the manner now necessary.

The specific operation together with numerous advantages of a gate operating mechanism of the present invention, will be at once apparent to those skilled in the art, and even though I have herein set forth the most practical embodiment of this invention with which I am at the present time familiar, it is nevertheless to be understood that minor changes may be made therein without departing from the spirit and scope of the appended claim.

Having thus described my invention, what I claim as new and desire to secure by Letters Patent is:—

A gate structure comprising a panel hingedly mounted upon a post, a spring latch mounted upon the panel, strips applied to the sides of the panel, and disposed at the opposite sides of the post, a hood mounted upon the strips and disposed at the opposite side of the post from that side at which the panel is disposed, an arm pivotally mounted under the hood, a cable connecting the free end portion of the arm with the spring latch, a spring connected at one end with the arm and at its other end with the strips and being under tension with a tendency to normally hold the free end of the arm toward the latch, a guide member disposed between the strips and located under the hood at the opposite side of the arm, from that side thereof at which the spring is disposed, and a cable connected with the free end portion of the arm and trained through the said guide member.

In testimony whereof I affix my signature.

ROWLIN VAN McCLURE.